United States Patent [19]

Przygocki

[11] 4,033,497
[45] July 5, 1977

[54] COMBINATION QUICK REMOVAL AND ADJUSTABLE WIDTH WORK PRESSURE BACK-UP ROLL OR BILLET ROLL

[75] Inventor: Witold C. Przygocki, Southfield, Mich.

[73] Assignee: Acme Manufacturing Company, Ferndale, Mich.

[22] Filed: July 30, 1976

[21] Appl. No.: 710,257

[52] U.S. Cl. .............................. 226/194; 308/20
[51] Int. Cl.² ................................. B65H 17/20
[58] Field of Search .............. 308/15, 20; 226/194, 226/190, 189

[56] References Cited
UNITED STATES PATENTS

| 3,807,616 | 4/1974 | Hope et al. ............... 226/194 |
| 3,951,323 | 4/1976 | Libossart et al. ......... 226/194 X |

Primary Examiner—Joseph F. Peters, Jr.
Assistant Examiner—Gene A. Church
Attorney, Agent, or Firm—Harness, Dickey & Pierce

[57] ABSTRACT

A combination quick removal and segmentally adjustable work pressure back-up roll or billet roll (commonly called a billy roll) is mounted to freely float in a vertical direction with one end mounted within a sectional clamp. The clamp sections may pivot to open for quick removal of the entire roll. The roll is constructed of sleeve segments having their end faces of tongue and groove constructions which interfit to form a continuous roll and which may be longitudinally adjusted with respect to each other to accommodate work pieces of different widths and to facilitate removal and replacement of sections that may be worn more than others, without having to replace the entire roll.

5 Claims, 9 Drawing Figures

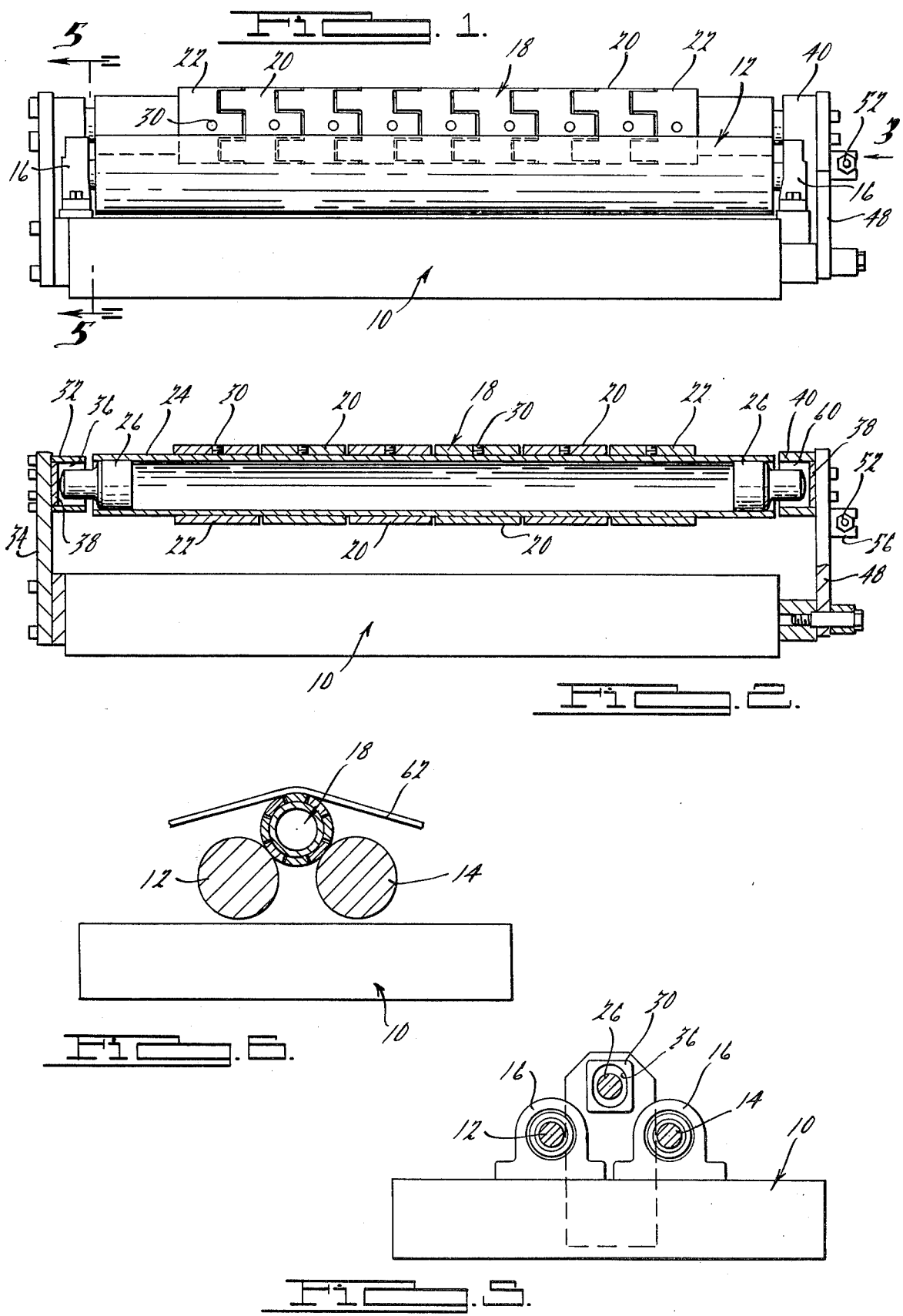

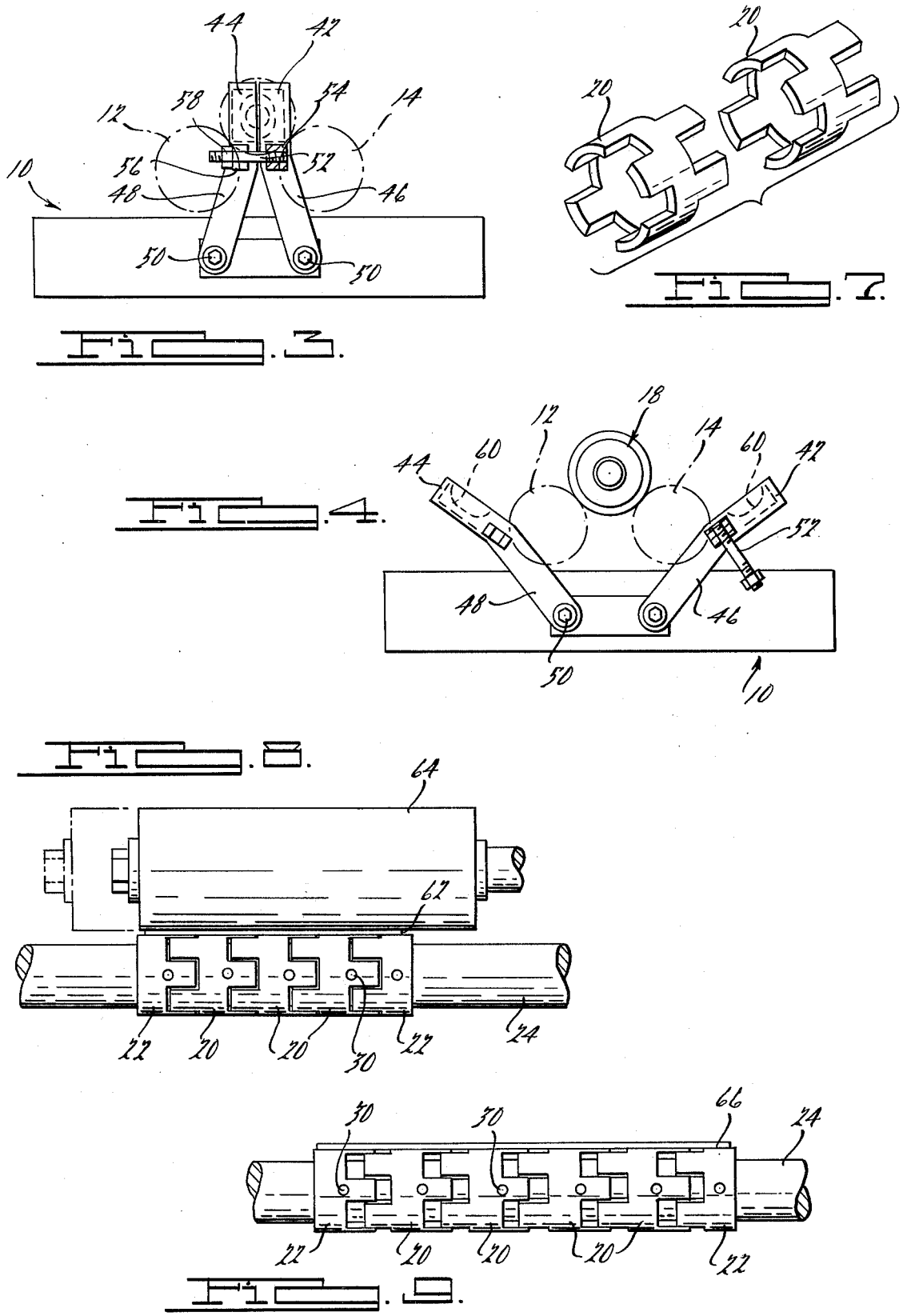

COMBINATION QUICK REMOVAL AND ADJUSTABLE WIDTH WORK PRESSURE BACK-UP ROLL OR BILLET ROLL

BACKGROUND OF THE INVENTION

Back-up pressure or billet rolls now in use are of unitary structure, often coated with a plastic material, which wears unevenly across the length of the rolls when used with work pieces of different widths. Consequently, the entire roll must be removed and replaced. The end mounts for such rolls are also of cumbersome constructions making the roll removal and replacement time consuming and costly since the apparatus must be shut down during this repair operation.

SUMMARY OF THE INVENTION

The general set up is conventional, i.e., a back-up or billet roll is supported on a pair of support rolls with the billet roll pressure positioned against the work piece, which may be a metal coil or plate. The top face of the work piece may be engaged by any of the conventional abrading, polishing or finishing rolls or by the conventional continuous belt type. In both instances, the rolls or belts are usually mounted for transverse or oscillation with respect to the work.

The back-up or billet roll of this invention is constructed of removable and longitudinally adjustable sections mounted on a central shaft. The ends of the sections are of tongue and groove formation, such tongues and grooves in the intermediate sections being formed in both end faces and in the end sections only in one end face. The adjacent sections are mounted to interlock and may be adjusted along the lengths of the interfitting tongues and grooves to effectively lengthen or shorten the roll to accommodate work pieces of different widths.

In order to effect these adjustments, or to replace work sections, the rolls must be removed. During this removal the machines must be shut down and, of course, shut-down time is costly. According to this invention, both ends of the billet roll are mounted to float freely in a vertical direction, and to a slight extent laterally. One end is mounted in a unitary bearing and the other end is mounted in a split clamp bearing which may be quickly opened to pull out the roll.

BRIEF DESCRIPTION OF THE DRAWINGS

FIG. 1 is a side elevational view of combination billet and support roll and showing the construction for mounting such rolls according to the present invention;

FIG. 2 is a view similar to FIG. 1 with the support rolls removed and showing the billet roll in longitudinal cross section for purpose of clarity and detail;

FIG. 3 is an end elevational view taken in the direction of arrow 3 of FIG. 1 and showing the split retainer for mounting one end of the billet roll in position;

FIG. 4 is a view similar to FIG. 3 showing the split retainer for removal of the billet roll;

FIG. 5 is a transverse sectional view taken substantially along the line 5—5 of FIG. 1;

FIG. 6 is a transverse sectional view of the roll showing a work piece in the form of a continuous strip of steel on the top of the billet roll;

FIG. 7 is a prospective view showing the billet roll sections separated;

FIG. 8 is a partial view showing the billet roll having a work piece disposed thereon and showing a conventional finishing roll disposed thereabove;

FIG. 9 is a view to FIG. 8 having a wider work piece and showing the billet roll section adjustably extended.

DESCRIPTION OF THE PREFERRED EMBODIMENT

In FIG. 1, a supporting frame is generally indicated at 10 and such frame may be of conventional construction and may be supported on the floor or on another main frame which in turn is supported on the floor. Conventional support rolls are indicated at 12 and 14 and such support rolls each having their ends mounted in fixed bearings 16 fixedly mounted on the frame 10.

The billet roll according to the present invention, is generally indicated at 18 and comprises a plurality of intermediate sleeve segments 20 which are generally tubular in form and which have their end faces formed with tongue and groove elements so that they may interfitted as best shown in FIGS. 7 and 1. The end segments 22 only have the interfitting tongue and groove formation on one face so that they may interconnected with the adjacent interfitting section 20. The segments 20 and 22 are mounted on a support shaft 24 which has projecting end bearings 26 indicated at each end thereof. Each section 20 and 22 may be adjustably fixed longitudinally on the shaft 24 and longitudinally fixed relative to each other by means of set screws 30.

The sections 20 may be of such number as required depending upon the transverse sizes of the finishing machine with which the rolls are used.

One end of the shaft 24 is received within a support 32 which is fixed to an upright arm 34 bolted to one end of frame 10. The support 32 has a vertically elongated support opening 36 within which the end of the shaft bearing 26 is received. The slot 36 is also of predetermined width slightly larger than the diameter of the shaft 36 so as to permit limited lateral movement of the shaft 36 therein.

An end thrust plate 38 is disposed within the support 30 at the interface thereof.

The opposite end of the shaft 24 is received within the retainer 40 which is formed of split halves 42 and 44. The split halves 42 and 44 are fixed to the upper ends of pivot arms 46 and 48, respectively. The arms 46 and 48 are pivotally mounted on the frame 10 on the pivots 50.

The split halves are fixed together by means of a pivottype locking bolt 52 having one end threaded in a pivot support 54 and having the other end received within the open end of a U-shaped support 56. A nut 58 locks the bolt as shown in FIG. 3.

The split sections 42 and 44 may be opened by removing the locking bolt 52 as shown in FIG. 4 to a position for removal of the billet roll 18.

When the split retainer halves are in the locked position as shown in FIG. 3, they form a vertically elongated retainer 60 which is similar to configuration to the opening 36 in the retainer at the opposite end of the billet roll.

The retainer openings 36 and 60 thus permit a floating support for the billet roll 18 so that the billet roll 18 is supported on the support rolls 12 and 14 as shown in FIGS. 3, 4 and 6.

Referring to FIG. 6, a work piece in the form of a coil strip 62 is illustrated. Such strip 62 is supported on the top surface of the billet roll 18. The top face of such work piece 62 is engaged in the usual way in any of the conventional abrading, polishing or finishing rolls or by a conventional continuous belt. The work piece 62 is illustrated in FIG. 8 as being of a relatively narrow width. In this instance, the top of the work piece is engaged by a conventional finishing roll 64 which is mounted to oscillate in the conventional way between the position shown by the full lines and the dotted lines in FIG. 8 transversely of the work piece 62.

For this relatively narrow width work piece 62, the sleeves 20 and 22 are fixed on the support shaft 24 in compressed relation relative to each other.

Where a wider work piece 66 is being worked upon, as illustrated in FIG. 9, additional segments 22 may be added and such segments may be extended relative to each other and fixed to the shaft 24. By thus accommodating various widths of work pieces with full backing support of the billet roll, uniform pressures are applied to the work pieces transversely thereof.

In order to add or substract billet roll sections 20 to accommodate different widths of work pieces, the billet roll 18 may be readily removed. This is accomplished by separating the split retainer halves and lifting the billet roll 18 out of the machine. This ease of removal of the billet roll not only has the advantage of adding or subtracting billet roll sections, but also quickly and easily replaces such billet rolls which may have been unevenly worn. Thus, improvement in function and savings in operation are accomplished.

What is claimed is:

1. The combination of billet and support rolls with means for mounting such rolls, such mounting means including fixed bearings for mounting a pair of support rolls, a billet roll retainer for mounting said billet roll at one end, split retainer halves for mounting said billet roll at its opposite end, pivot arms connected to said split retainer halves to pivot and open said split halves for removal of said billet roll, means to secure said pivot arms and said split halves together, said fixed billet roll retainer and said split bearing being constructed to permit said billet roll to freely float vertically within its retainer and thus mount said billet roll for support of said support rolls.

2. The combination according to claim 1 in which said billet roll is constructed of interfitting sleeve segments longitudinally adjustable relative to each other, said sleeve segments being adjustably fixed on a support shaft.

3. The combination according to claim 2 in which one end of said support shaft is received in said fixed roll retainer and the other end of said shaft is received in said split retainer.

4. The combination of billet and support rolls with mean for mounting such rolls, such mounting means including fixed bearings for mounting a pair of support rolls, a billet roll retainer having a vertically directed elongated slot for mounting said billet roll at one end, split retainer halves forming a vertically directed elongated slot for mounted said billet roll at its opposite end, pivot arms connected to said split retainer halves to pivot and open said split halves for removal of said billet roll, means to secure said pivot and said split halves together, the vertically directed elongated slot of said fixed billet roll retainer and said split bearing being constructed to permit said billet roll to freely float vertically within its retainers and thus mount said billet roll for support on said support rolls.

5. The combination according to claim 4 in which said billet roll is constructed of interfitting tongue and groove sleeve segments longitudinally adjustable relative to each other, said sleeve segments being adjustably fixed on a support shaft, one end of said support shaft is received in said fixed roll retainer and the other end of said shaft is received in said split retainer.

* * * * *

UNITED STATES PATENT AND TRADEMARK OFFICE
CERTIFICATE OF CORRECTION

PATENT NO. : 4,033,497
DATED : July 5, 1977
INVENTOR(S) : Witold C. Przygocki

It is certified that error appears in the above-identified patent and that said Letters Patent are hereby corrected as shown below:

Column 1, line 26, delete "or".

Column 1, line 61, after "retainer" insert --halves--.

Column 2, line 23, after "may" insert --be--.

Column 2, line 59, after similar "to" should be --in--.

Column 4, line 5, "of" should be --on--.

Column 4, line 16, "mean" should be --means--.

Column 4, line 22, "mounted" should be --mounting--.

Column 4, line 26, "slot" should be --slots--.

Signed and Sealed this

Eighth Day of November 1977

[SEAL]

Attest:

RUTH C. MASON
*Attesting Officer*

LUTRELLE F. PARKER
*Acting Commissioner of Patents and Trademarks*